United States Patent
Ueno et al.

(10) Patent No.: US 7,824,586 B2
(45) Date of Patent: *Nov. 2, 2010

(54) COMPRESSION MOLDING MACHINE FOR BRIQUETTE FOR METAL RAW MATERIAL, MANUFACTURING APPARATUS FOR BRIQUETTE FOR METAL RAW MATERIAL, AND COMPRESSION MOLDING METHOD THEREOF

(75) Inventors: Hiroshi Ueno, Tondabayashi (JP); Masafumi Sedo, Kobe (JP); Mitsuma Matsuda, Takamatsu (JP); Shigenobu Hasui, Kashiwara (JP); Shinji Urata, Ikoma (JP); Tetsuo Shigemi, Higashiosaka (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 308 days.

This patent is subject to a terminal disclaimer.

(21) Appl. No.: 11/886,470

(22) PCT Filed: Mar. 17, 2006

(86) PCT No.: PCT/JP2006/305383

§ 371 (c)(1), (2), (4) Date: Sep. 17, 2007

(87) PCT Pub. No.: WO2006/101042

PCT Pub. Date: Sep. 28, 2006

(65) Prior Publication Data

US 2008/0181806 A1    Jul. 31, 2008

(30) Foreign Application Priority Data

| Mar. 18, 2005 | (JP) | ............... 2005-080243 |
| Mar. 18, 2005 | (JP) | ............... 2005-080244 |
| Mar. 18, 2005 | (JP) | ............... 2005-080257 |
| Mar. 18, 2005 | (JP) | ............... 2005-080258 |

(51) Int. Cl.
 B28B 3/02    (2006.01)
 B28B 13/00   (2006.01)
(52) U.S. Cl. .................. 264/117; 425/256; 425/258; 425/355; 425/423
(58) Field of Classification Search ............ 425/219, 425/256, 258, 355, 407, 423; 100/43, 47–48, 100/50, 240, 226, 273; 75/313, 765; 264/109, 264/117
See application file for complete search history.

(56) References Cited

U.S. PATENT DOCUMENTS 4,389,928 A * 6/1983 Burgin .................. 100/37

(Continued)

FOREIGN PATENT DOCUMENTS

EP    1 149 926 A2    10/2001

(Continued)

*Primary Examiner*—Richard Crispino
*Assistant Examiner*—Thu Khanh T Nguyen
(74) *Attorney, Agent, or Firm*—Birch, Stewart, Kolasch & Birch, LLP

(57) ABSTRACT

There is provided a compression molding machine capable of manufacturing briquettes by compression molding a material efficiently. The compression molding machine includes a mold device (12) formed with a molding chamber and a plunger (15) provided so as to be capable of advancing and retreating in the axial direction to compression mold the material in the molding chamber. The molding device (12) includes an axially fixed pressure receiving member (16) facing to a tip end surface (15a) of the plunger (15), an outside mold (44) in sliding contact with the outer peripheral surface of the plunger (15), and supporting means which supports the outside mold (44) so that the outside mold (44) moves in an extrusion direction of the plunger (15) in association with the movement of the plunger (15) in the extrusion direction.

17 Claims, 11 Drawing Sheets

U.S. PATENT DOCUMENTS

| | | | | |
|---|---|---|---|---|
| 4,544,451 | A | * 10/1985 | Weber et al. | 202/114 |
| 5,307,739 | A | * 5/1994 | Gourdol | 100/98 R |
| 6,745,679 | B2 | * 6/2004 | Nakamura et al. | 100/50 |
| 2001/0050006 | A1 | 12/2001 | Nakamura et al. | |

FOREIGN PATENT DOCUMENTS

| | | |
|---|---|---|
| JP | 3009829 U | 2/1995 |
| JP | 2001-300784 A | 10/2001 |
| JP | 2002-121625 A | 4/2002 |
| JP | 2002-129248 A | 5/2002 |
| JP | 2003-71594 A | 3/2003 |
| JP | 2003-221625 A | 8/2003 |
| JP | 2004-66290 A | 3/2004 |
| JP | 2004-141935 A | 5/2004 |
| JP | 2004-337972 A | 12/2004 |

\* cited by examiner

COMPRESSION MOLDING MACHINE FOR BRIQUETTE FOR METAL RAW MATERIAL, MANUFACTURING APPARATUS FOR BRIQUETTE FOR METAL RAW MATERIAL, AND COMPRESSION MOLDING METHOD THEREOF

TECHNICAL FIELD

The present invention relates to a compression molding machine and a manufacturing apparatus for a briquette for a metal raw material, and a compression molding method thereof. In particular, it relates to an apparatus for obtaining briquettes from a recyclable material containing metal powder such as grinding chips.

BACKGROUND ART

Chips and grinding sludge produced when an iron-base metal such as bearing steel and carburizing steel is ground or polished are recovered as a flocculent (fibrous) aggregate including a grinding fluid which contains water and oil, and abrasive grains. Since this flocculent aggregate contains a large amount of pure iron, a technique for reusing this as a steel making raw material has been proposed from the viewpoints of environmental protection and resource saving. For example, as shown in Japanese Patent Laid-Open No. 2002-129248, a compact, which is obtained by compression molding a flocculent aggregate, is impregnated with a solidifying auxiliary substance (hardening fluid), and then drying treatment is performed, by which briquettes are manufactured. Then, the manufactured briquettes are recovered by a steel maker, being remelted, and are recycled.

As an apparatus for manufacturing such briquettes, the apparatus disclosed, for example, in Japanese Registered Utility Model No. 3009829 has been known conventionally. This apparatus includes a screw for feeding a charged flocculent aggregate into a mold (molding chamber) on the lower side and a pressing machine for compression molding the aggregate fed into the mold.

The mold of the pressing machine described in Japanese Registered Utility Model No. 3009829 is firmly fixed to an apparatus frame, and the flocculent aggregate, which is the material for briquettes, is compressed in the cavity of this mold. The compressed aggregate spreads in the cavity to the side in the direction perpendicular to the pressing direction of the pressing machine, and is pushed strongly against the inner peripheral surface of the mold. Therefore, the aggregate is compressed while producing a great frictional resistance (sliding force) between the aggregate and the inner peripheral surface of the mold. For this reason, the pressing force of the pressing machine requires a force for withstanding this frictional resistance in addition to a force for actually compressing the aggregate, which presents a problem in that the efficiency is poor and hence a pressing machine with a high capacity is needed.

The flocculent aggregate, which is the material for briquettes, contains a large amount of water, so that in order to obtain recyclable briquettes, the briquettes must be dried sufficiently. The reason for this is that if briquettes from which water is removed insufficiently are charged into a blast furnace of a steel maker as they are, bumping (water vapor explosion) may be generated by the water in the briquettes.

A method is conceivable in which water is removed by applying a high compressive load to the flocculent aggregate, which is the material for briquettes, using the pressing machine described in Japanese Registered Utility Model No. 3009829. However, even if the aggregate is compressed by increasing the compressive load, water drainage from the mold is poor, so that it is difficult to remove water sufficiently. Further, since the water drainage is poor, the loss of pressing force of the pressing machine occurs. For the conventional apparatus, even if the compressive load is increased, the removal of water has a limit, and thus a problem of wastefully increasing capability (capacity) of the pressing machine arises.

It is also conceivable that dried briquettes are obtained by separately installing a drier, in addition to the apparatus described in Japanese Registered Utility Model No. 3009829, in order to sufficiently remove water. That is to say, it is conceivable to perform treatment by arranging the pressing machine for performing compression molding and the drier for performing drying independently in one plane in a mill, and connect the machines to each other by separately installing a conveyor or by manually.

However, in the case where each machines are arranged independently in one plane in a mill in this manner, the installation area (occupied area) of the whole facility becomes very large. Also, a problem arises in that work for carrying briquettes from machine to machine manually is troublesome and much manpower is required.

DISCLOSURE OF THE INVENTION

The present invention has been made in view of the above circumstances, and accordingly an object thereof is to provide a compression molding machine for a briquette, which is capable of manufacturing a briquette by compression molding a recyclable material efficiently, a briquette manufacturing apparatus provided with the compression molding machine, and a compression molding method for a briquette. Another object is to provide a manufacturing apparatus for a briquette for a metal raw material, which is capable of manufacturing a recyclable briquette with a small apparatus installation area.

To achieve the above object, the present invention provides a compression molding machine for a briquette for a metal raw material, including a mold device in which a molding chamber for compression molding a recyclable material containing metal powder is formed; and a plunger which is provided coaxially with the molding device so as to be capable of advancing and retreating in the axial direction to compression mold the material supplied into the molding chamber, characterized in that the molding device includes an axially fixed pressure receiving member forming a pressure receiving surface facing to the tip end surface of the plunger; an outside mold having a slidingly contacting surface, which is in sliding contact with the outer peripheral surface of the plunger, therein; and supporting means which supports the outside mold so that the outside mold moves to a fore side in the extrusion direction of the plunger in association with the movement of the plunger to a fore side in the extrusion direction.

According to the above-described configuration, since the outside mold is supported by the supporting means, when the material is compression molded in the mold device by the plunger, the outside mold can be moved to a fore side in the extrusion direction of the plunger in association with the movement of the plunger in the extrusion direction. That is to say, the outside mold can be moved to a fore side in the extrusion direction together with the material being compressed, so that frictional resistance produced between the outer peripheral surface of the material being compressed and the slidingly contacting surface (inner peripheral surface) of the outside mold can be released (reduced). Thereby, the pressing force generated on the plunger side can be kept from being consumed as a force against the frictional resistance, so that necessary power (capacity) in the compression molding machine can be decreased. Further, the wear of the slidingly contacting surface of the mold device can be reduced.

Then, a compression molding method for briquettes using the above-described compression molding machine is a method in which the recyclable material containing metal powder is filled in the molding chamber formed by the axially fixed pressure receiving surface facing to the tip end surface of the plunger and a sliding surface with which the outer peripheral surface of the plunger is in sliding contact, and the material is compressed by the plunger moving toward the molding chamber, by which a solidified compact is obtained, and also is a method in which the sliding surface is moved to a fore side in the extrusion direction of the plunger in association with the movement of the plunger to a fore side in the extrusion direction.

Also, the outside mold is preferably divided into a fore portion and a rear portion in the extrusion direction of the plunger into a first mold and a second mold, the first mold being arranged at a position such as to be penetrated by the plunger at the time of the maximum stroke, and the second mold being arranged at a position such that the compact compressed by the plunger at the time of the maximum stroke is filled therein. According to this configuration, in order to discharge the compact from the interior of the second mold, the second mold is moved through a small stroke in the direction such as to separate from the first mold, for example, by an actuator for discharging the material, described later.

In the case where the outside mold is divided as described above, further, the supporting means preferably has a function of producing a difference in displacement in the extrusion direction of the plunger between the first and second molds so that a gap is formed between the first and second molds after the plunger has penetrated the first mold. In this case, the difference in displacement between the first and second molds is produced, by which the gap can be formed between the first and second molds. Thereby, through this gap, excess water in the material, which is produced by the compression of material, can be discharged to the outside of the mold device. Therefore, the water contained in the material can be removed effectively.

The compression molding method for briquettes using the above described compression molding machine is a method in which during the compression molding operation using the plunger, the gap for drainage is produced by dividing the sliding surface into a fore portion and a rear portion on a rear side in an extrusion direction of the plunger from the filling portion of the compact.

Also, the supporting means having the function of producing the difference in displacement between the first and second molds can specifically include a first support mechanism which supports the first mold so that the first mold moves to a fore side in the extrusion direction of the plunger in association with the movement of the plunger to a fore side in the extrusion direction; and a second support mechanism which supports the second mold so that the second mold moves to a fore side in the extrusion direction of the plunger together with the first mold when the plunger does not penetrate the first mold, and so that the second mold moves farther to a fore side in the extrusion direction of the plunger from the first mold when the plunger has penetrated the first mold.

According to this configuration, in the first and second molds, the frictional resistance produced between the outer peripheral surface of the material being compressed and the first and second molds can be released (reduced), so that necessary power (capacity) in the compression molding machine can be decreased. When the plunger penetrates the first mold, the gap can be formed between the first and second molds by the further movement of the second mold. Through the gap, excess water in the material can be discharged to the outside of the mold device.

Also, the second support mechanism preferably has the actuator for discharging the compact, which moves the second mold to a fore side in the extrusion direction of the plunger to expose the compact. According to this configuration, the compact can be taken out of the second mold easily.

Also, the outside mold preferably has support members for supporting the compact, which is discharged from the second mold, at two points from the downside, the support members being provided in nearby portions under an opening end of a cavity formed in the second mold. According to this configuration, the compact having been taken out of the second mold is supported at two points from the downside by support members, so that the taken-out compact can be prevented from tilting or adopting an improper posture. Thereby, the compact can be transferred easily to the next process. Since the mold has the support members, the configuration is simplified.

Also, a manufacturing apparatus for a briquette for a metal raw material, which is provided with the above-described compression molding machine, including a hopper attached to a frame; the compression molding machine for compression molding the material charged from the hopper; and a conveying machine with a drying function, which transports the compression molded compact while drying the compact can be configured so that the compression molding machine includes the mold device in which the molding chamber for compression molding a recyclable material containing metal powder is formed; and the plunger which is provided coaxially with the molding device so as to be capable of advancing and retreating in the axial direction to compression mold the material supplied into the molding chamber, and the molding device includes the axially fixed pressure receiving member forming the pressure receiving surface facing to the tip end surface of the plunger; the outside mold having the slidingly contacting surface, which is in sliding contact with the outer peripheral surface of the plunger, therein; and the supporting means which supports the outside mold so that the outside mold moves to a fore side in the extrusion direction of the plunger in association with the movement of the plunger to a fore side in the extrusion direction.

Also, to achieve the above object, the manufacturing apparatus for a briquette for a metal raw material in accordance with the present invention is characterized by including the compression molding machine for obtaining a compact by compression molding a recyclable material containing metal powder; a drier for drying the compact; the conveying machine for transporting the compact to the drier side; and one frame on which the drier and the compression molding machine are mounted in a state of upper and lower two-stage arrangement so that the drier lies in the upper stage portion and the compression molding machine lies in the lower stage portion.

According to such a configuration, if the recyclable material containing metal powder is charged into the manufacturing apparatus, a plurality of treatments of compression molding, transporting, and drying the material can be performed automatically by one apparatus. That is to say, if the material is charged, sufficiently dried high-quality briquettes can be obtained automatically. Further, since the drier and the compression molding machine are mounted in a state of upper and lower two-stage arrangement on one frame, the installation area of apparatus can be decreased.

Since the compression molding machine lies in the lower stage portion and the drier lies in the upper stage portion, a safe apparatus can be comprised. That is to say, by locating the drier having a high temperature is located above the compression molding machine, the influence exerted on the compression molding machine by the heat generated by the drier can be lessened.

Since the drier is provided, the briquettes obtained by this manufacturing apparatus can be dried. Therefore, even if the briquettes are charged into a blast furnace as they are, there is no fear of the occurrence of bumping.

Also, an impregnation machine for dipping the compact into a fluid containing a solidifying auxiliary substance is preferably provided between the compression molding machine in the lower stage portion and the drier in the upper stage portion. According to this configuration, the compact can be impregnated with the solidifying auxiliary substance. Thereby, the briquettes can be solidified to a desired strength, and the shapes thereof can be kept for a long period of time. Therefore, the handling such as transportation and storage of the manufactured briquettes is easy.

Also, it is preferable that the compression molding machine include the mold device in which the molding chamber for molding a recyclable material is formed; and a pressing rod for pressing the material along the lengthwise direction of the frame to compression mold the material in the mold device, and the drier include a drying oven for conveying the compact along the lengthwise direction of the frame.

According to this configuration, the length of the drying oven for drying the compact while being transported can be increased, and the drying time can be prolonged.

By providing the pressing rod that advances and retreats along the lengthwise direction of the frame, a lengthwise space in the lower stage portion of the frame can be utilized effectively, so that the whole of apparatus can be made compact.

Also, it is preferable that the mold device be arranged on one side in the lengthwise direction of the frame, and the conveyance direction of the compact in the drying oven be directed from one side to the other side in the lengthwise direction of the frame. According to this configuration, the layout of each equipment is further optimized, and hence the apparatus can be made compact. That is to say, the compact compression molded in the mold device arranged on one side in the lengthwise direction of the frame can be transported to the upper stage portion on one side in the lengthwise direction by the conveying machine, and in the drying oven in the upper stage portion, the compact can be dried while being transported from one side toward the other side in the lengthwise direction. Also, the travel distance of compact between the compression molding machine and the drying oven can be shortened. In this respect as well, the apparatus can be made compact.

BEST MODE FOR CARRYING OUT THE INVENTION

An embodiment of the present invention will now be described with reference to the accompanying drawings.

Figure 1:
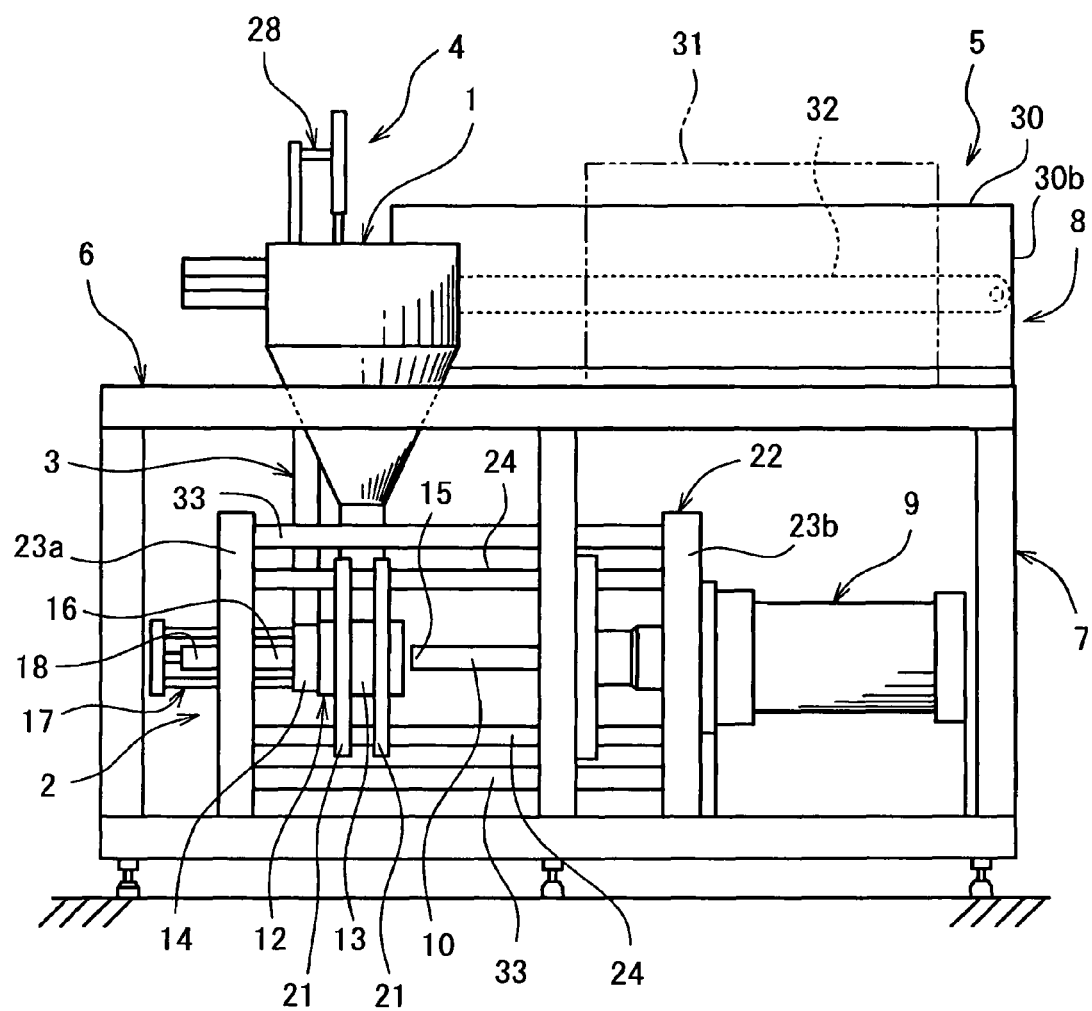
FIG. 1 is a front view schematically showing a briquette manufacturing apparatus in accordance with the present invention.
Figure 2:
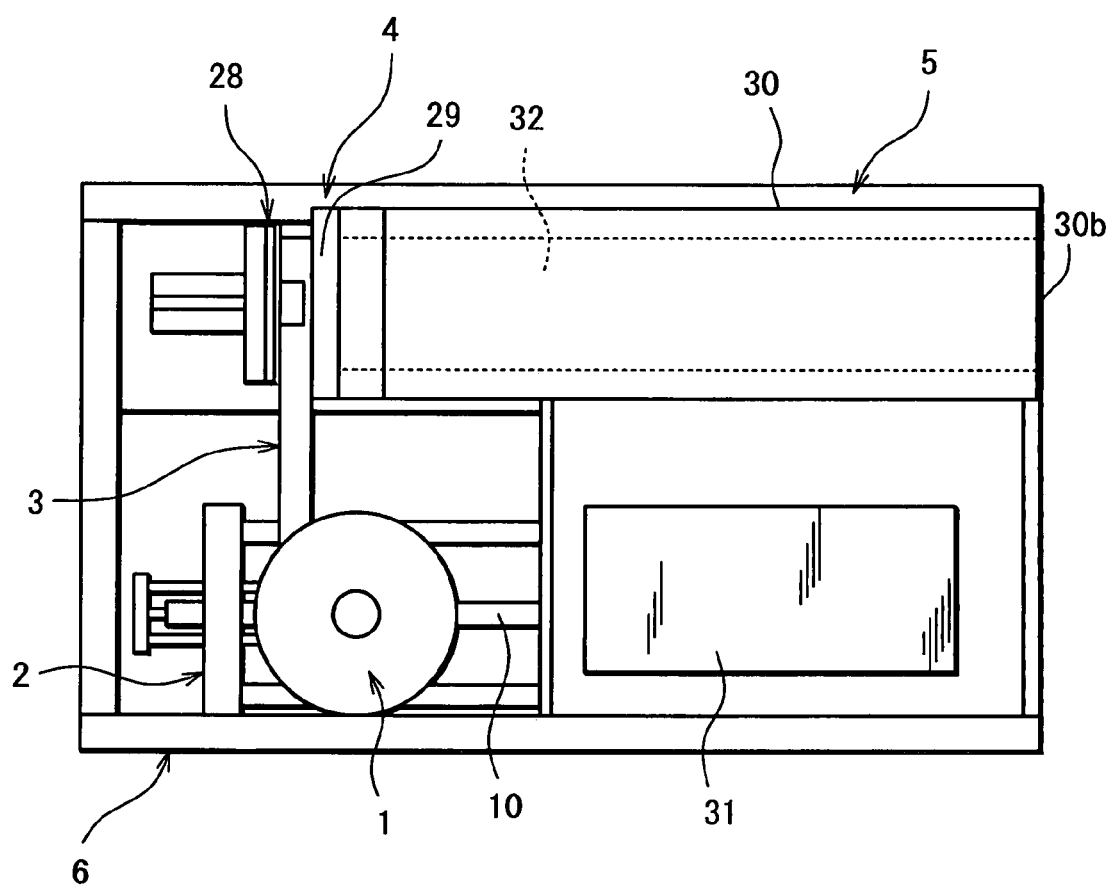
FIG. 2 is a plan view of FIG. 1.
Figure 3:
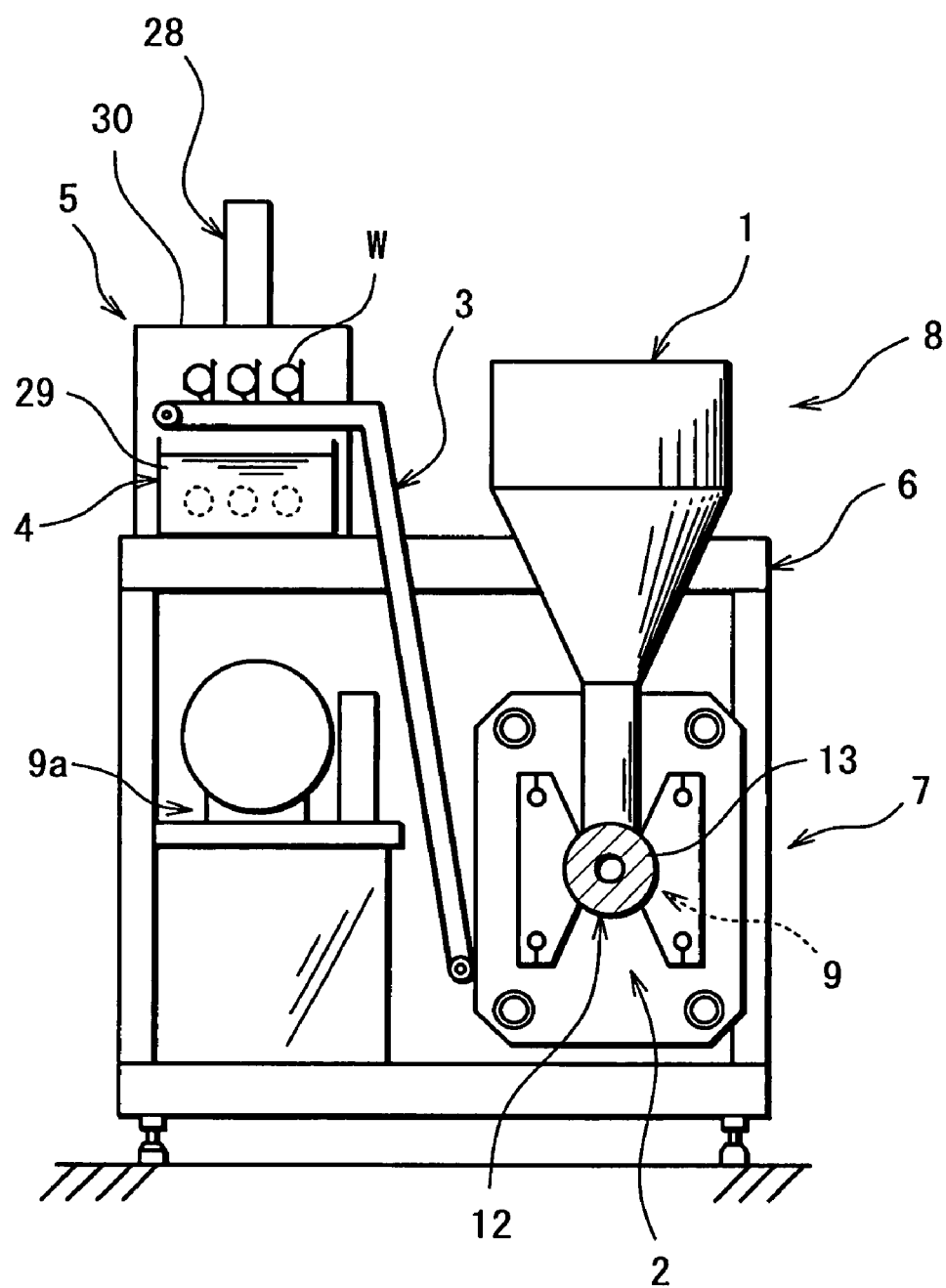
FIG. 3 is a side sectional view of FIG. 1.

FIG. 1 is a front view schematically showing a briquette manufacturing apparatus for metal raw material in accordance with the present invention, FIG. 2 is a plan view of the briquette manufacturing apparatus shown in FIG. 1, and FIG. 3 is a side sectional view of the briquette manufacturing apparatus shown in FIG. 1.

The briquettes manufactured by this manufacturing apparatus are ones obtained by solidifying a flocculent aggregate (a recyclable material containing metal powder) containing grinding chips produced, for example, when an iron-base metal member such as hardened bearing steel and carburizing steel is ground.

This manufacturing apparatus is constructed by mounting a compression molding machine 2, a conveying machine 3, a drier 5, and the like on one frame 6. In the manufacturing apparatus, a flocculent aggregate (hereinafter referred also to as a material) charged from a hopper 1 installed on the frame 6 is compression molded by the compression molding machine 2, a compression molded compact W is transported to the drier 5 side by the conveying machine 3, and the compact W is dried and solidified in the drier 5, by which briquettes are manufactured.

The hopper 1 is provided in an upper stage portion 8 of the frame 6. The material charged through a charge port of the hopper 1 that is open upward in the upper stage portion 8 is supplied to a mold device 12 of the compression molding machine 2 in a lower stage portion 7 of the frame 6 by a screw, not shown, in the hopper 1.

The compression molding machine 2 is used to obtain the compact W of a short columnar shape by compression molding the material charged from the hopper 1. The compression molded compact W is transported to the upper stage portion 8 side of the frame 6 by the conveying machine 3, and is dried by the drier 5 provided in the upper stage portion 8. The compact W that has been transported to the upper stage portion 8 by the conveying machine 3 may be dried directly by being charged into a drying oven 30 of the drier 5. However, as shown in FIG. 1, the compression molded compact W is dried by the drier 5 after the compact W has been impregnated with a solidifying auxiliary substance in an impregnation machine 4. The impregnation machine 4 is provided between the compression molding machine 2 in the lower stage portion 7 and the drier 5 in the upper stage portion 8. In FIG. 1, the impregnation machine 4 is provided near the inlet of the drier 5 in the upper stage portion 8 of the frame 6.

The general construction of the briquette manufacturing apparatus in accordance with the present invention is first explained.

As shown in FIGS. 1 to 3, the frame 6 is assembled into a rectangular parallelepiped shape, for example, by straight line shaped section steels, and has a transversely long shape in which the dimension in the width direction (the right and left direction in FIG. 2) is larger than the dimension in the depth direction (the up and down direction in FIG. 2).

For this briquette manufacturing apparatus, the drier 5 and the compression molding machine 2 are arranged at two upper and lower stages so that the drier 5 is located in the upper stage portion 8 of the frame 6 having a transversely long rectangular parallelepiped shape and the compression molding machine 2 is located in the lower stage portion 7 of the frame 6, and are mounted on one common frame 6. The conveying machine 3 connects the lower stage portion 7 to the upper stage portion 8 on the frame 6.

The compression molding machine 2 is explained. The compression molding machine 2 has a pressing machine 9 and a mold device 12 for obtaining the compact W by compression molding the material. The pressing machine 9 is formed, for example, by a hydraulic cylinder having a pressing rod 10. The pressing rod 10 advances linearly toward the mold device 12, so that a plunger 15 provided at the tip end of the pressing rod 10 presses the material supplied into the mold device 12, and thereby the material is compressed.

Next, the drier 5 is explained. The drier 5 has the drying oven 30 for drying the compact W, which has been molded by the compression molding machine 2 and has been impregnated with the solidifying auxiliary substance, by warm air (hot air) and a warm air generator 31 for supplying warm air into the drying oven 30. The compact W impregnated with the solidifying auxiliary substance is charged into the drying oven 30, and is dried while being conveyed by a conveyor 32 in the drying oven 30. By allowing the compact W to pass through the drying oven 30, dried high-quality briquettes can be obtained.

As shown in FIG. 1, the axial direction of the pressing rod 10 for pressing the material is identical with the lengthwise direction (width direction) of the frame 6, and the conveyance direction of the drying oven 30 for drying the compact W while being conveyed is identical with the lengthwise direction (width direction) of the frame 6, being the same direction as described above. That is to say, in the lower stage portion 7 of the frame 6, the pressing machine 9 and the mold device 12 are disposed so as to be arranged along the lengthwise direction of the frame 6, and this disposition direction is identical with the axial direction of the pressing rod 10 of the pressing machine 9 (the extrusion direction of the plunger 15). The axial direction of the pressing rod 10 is parallel with the conveyance direction of the drying oven 30 in the upper stage portion 8.

Thereupon, the pressing machine 9 that is long in the axial direction coincides with the lengthwise direction of the frame 6, and the drying oven 30 having a long transportation path coincides with the lengthwise direction of the frame 6, so that the whole of apparatus can be made compact.

Further, the mold device 12 of the compression molding machine 2 is provided on one side in the lengthwise direction of the frame 6 (in the left-hand side portion of the lower stage portion 7 in FIG. 1), and the conveyance direction of the compact W in the drying oven 30 of the drier 5 is identical with the direction directed from one end side in the lengthwise direction to the other side in the lengthwise direction (the direction directed from the left-hand side portion to the right-hand side portion of the upper stage portion 8 in FIG. 1).

Thereupon, in FIG. 1, the compact W having been compression molded in the mold device 12 located in the left-hand side portion of the lower stage portion 7 of the frame 6 is transported to the left-hand side portion of the upper stage portion 8 by the conveying machine 3, being impregnated with the solidifying auxiliary substance in the left-hand side portion of the upper stage portion 8, and is dried while being conveyed from the left-hand side portion to the right-hand portion in the drying oven 30 in the upper stage portion 8, by which briquettes can be obtained. Therefore, the travel distance of the compact W from the mold device 12 to the drying oven 30 can be shortened, so that the apparatus can be made compact.

As shown in FIG. 3, in the lower stage portion 7 of the frame 6, the pressing machine 9 and the mold device 12 are arranged in the front portion (the right-hand side portion in FIG. 3) in the horizontal direction (hereinafter referred to as the depth direction) perpendicular to the lengthwise direction of the frame 6, and a hydraulic unit 9a for the pressing machine 9 consisting of the hydraulic cylinder is arranged in the rear side portion (left-hand side portion) in the depth direction. Also, as shown in FIG. 2, in the upper stage portion 8 of the frame 6, the charge port of the hopper 1 and the warm air generator 31 of the drier 5 are arranged in the front portion in the depth direction, and the impregnation machine 4 and the drying oven 30 of the drier 5 are arranged in the rear side portion in the depth direction. The conveying machine 3 can transport the compact W, which has been compression molded in the front portion of the lower stage portion 7, to the rear side portion of the upper stage portion 8 along the vertical plane through a short distance.

Further, the drying oven 30 and the warm air generator 31 each have an entire shape of a transversely long rectangular parallelepiped, and are arranged in the upper stage portion 8 so that the lengthwise directions thereof are parallel with each other to make the whole apparatus compact and to decrease the total height.

According to the briquette manufacturing apparatus having the above-described construction, the whole apparatus can be made compact. In the case where the compression molding machine and the drier are arranged independently in one plane as in the conventional example, an installation area of about 9 m$^2$ is required. In contrast, according to the apparatus in accordance with the present invention, the required installation area can be decreased to about 3 m$^2$. That is to say, the installation area for the apparatus can be decreased, and dried briquettes that are preferable as a metal raw material can be manufactured.

Next, each equipment mounted on the frame 6 of the manufacturing apparatus is further explained.

The compression molding machine 2 has the pressing machine 9 and the mold device 12, and the pressing machine 9 can be formed, for example, by the hydraulic cylinder having the pressing rod 10. By the linear advance of the pressing rod 10 toward the mold device 12, the material supplied into a molding chamber in the mold device 12 is compressed by the plunger 15 in the tip end portion of the pressing rod 10. That is to say, the plunger 15 is provided coaxially with the mold device 12 so as to advance and retreat in the axial direction of the mold device 12.

As shown in FIGS. 1 and 4, the mold device 12 includes a pressure receiving member 16 forming a pressure receiving surface 16a facing to a tip end surface 15a of the plunger 15, and an outside mold 44 having a slidingly contacting surface, which is in sliding contact with the outer peripheral surface of the plunger 15, in the outside mold 44. The outside mold 44 has a cylindrical first mold 13 and a cylindrical second mold 14 located adjacent to the first mold 13 in the axial direction; namely, the outside mold 44 is a split mold dividedly formed into a fore portion and a rear portion in the plunger extrusion direction (the axial direction).

The first mold 13 is formed with an opening portion 13a, which is open to the hopper 1 side, in the upper part thereof so that the material supplied from the hopper 1 side is contained in the first mold 13 and the second mold 14. The second mold 14 is provided so as to be arranged in the axial direction on the same horizontal axis as that of the first mold 13. The second mold 14 is formed with a space portion having the same cross-sectional shape as that of the space portion of the first mold 13. The pressure receiving member 16 is fixed to a fixed plate 23a of a support 22 fixed to the frame 6.

The plunger 15 is formed in the tip end portion of the pressing rod 10 of the pressing machine 9 as shown in FIG. 1. The plunger 15 is first inserted into the first mold 13 and moved (driven) in the axial direction so as to press the material. The pressure receiving member 16 can be made in a rod shape, and the rod portion thereof is inserted into the second mold 14, so that the material is compressed by the plunger 15 moving in the axial direction toward this rod portion.

Figure 4A:
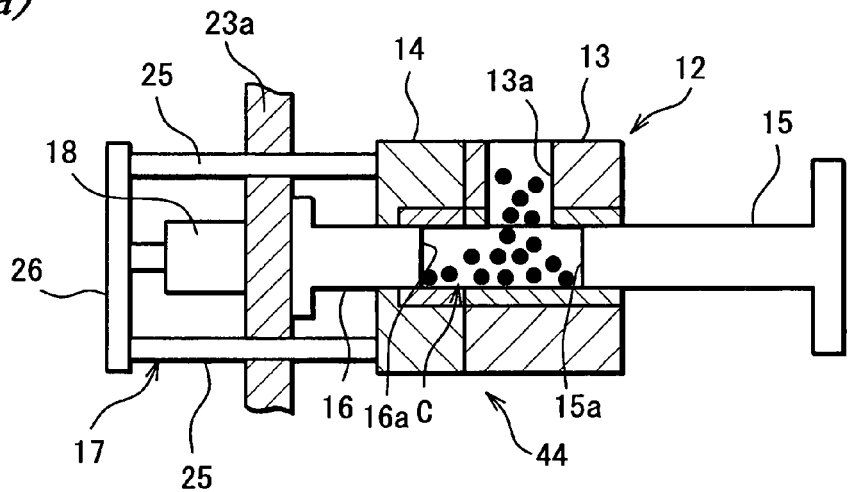
FIG. 4 is explanatory views of a mold device section of a compression molding machine.
Figure 4B:
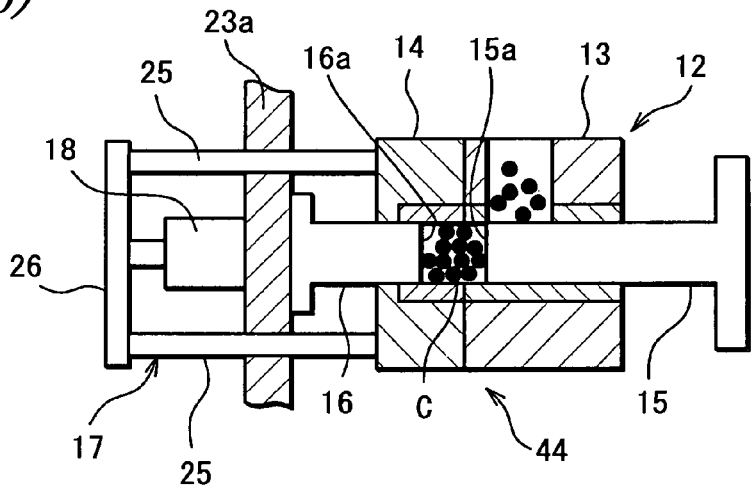
Figure 4C:
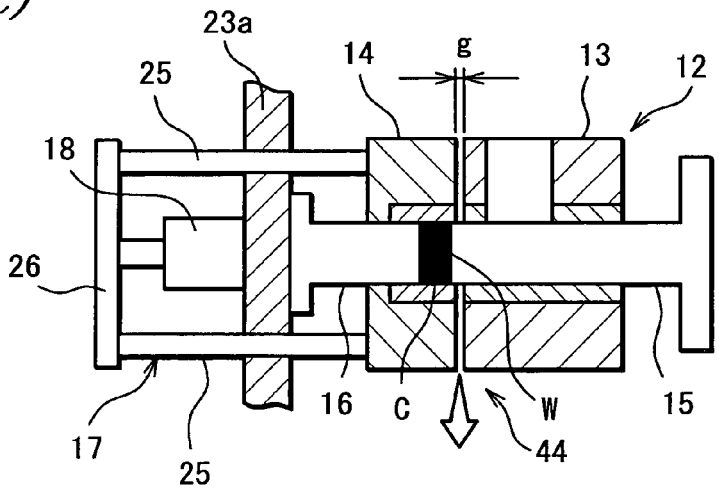

As shown in FIG. 4(c), in the outside mold 44, the first mold 13 is arranged at a position such as to be penetrated by the plunger 15 at the time of the maximum stroke of the plunger 15, and the second mold 14 is arranged at a position such that the compact W compressed by the plunger 15 is filled therein at the time of the maximum stroke of the plunger 15.

A space formed by the pressure receiving surface 16 of the pressure receiving member 16 and the sliding surface with which the outer peripheral surface of the plunger 15 is in sliding contact is the molding chamber for compression molding the material, the molding chamber being formed so as to have a circular transverse cross-sectional shape.

The mounting construction of the outside mold 44 is explained. The mold device 12 has supporting means that supports the outside mold 44. This supporting means supports the outside mold 44 so that the outside mold 44 moves in the extrusion direction of the plunger 15 in association with the movement of the plunger 15 in the extrusion direction. The displacement (minute displacement) of the outside mold 44 is far smaller than the displacement in the extrusion direction of the plunger 15. Also, the supporting means includes a first support mechanism 21 that supports the first mold 13, which is one of the dividedly constructed outside mold 44, and a second support mechanism 17 that supports the second mold 14, which is the other thereof.

Further, the supporting means has a function of producing a difference in displacement between the molds 13 and 14 so that a gap g is formed between the first mold 13 and the second mold 14 after the plunger 15 has penetrated the first mold 13 in the compression molding process as shown in FIG. 4(c).

The mounting construction of the outside mold 44 is explained in more detail. In FIG. 1, the support 22 for the compression molding machine 2 is fixed to the lower stage portion 7 of the frame 6. The support 22 has vertical fixed plates 23a and 23b erected on the mold device 12 side and the pressing machine 9 body side (cylinder side), respectively, of the frame 6, and four guide shafts 24 provided horizontally between the paired fixed plates 23a and 23b facing to each other. As shown in FIG. 1, four horizontal auxiliary rods 33 may be provided between the paired fixed plates 23a and 23b. Alternatively, though not shown in the figure, the auxiliary rods 33 are omitted, and the guide-shafts 24 may also be used as the auxiliary rods 33.

Figure 5:
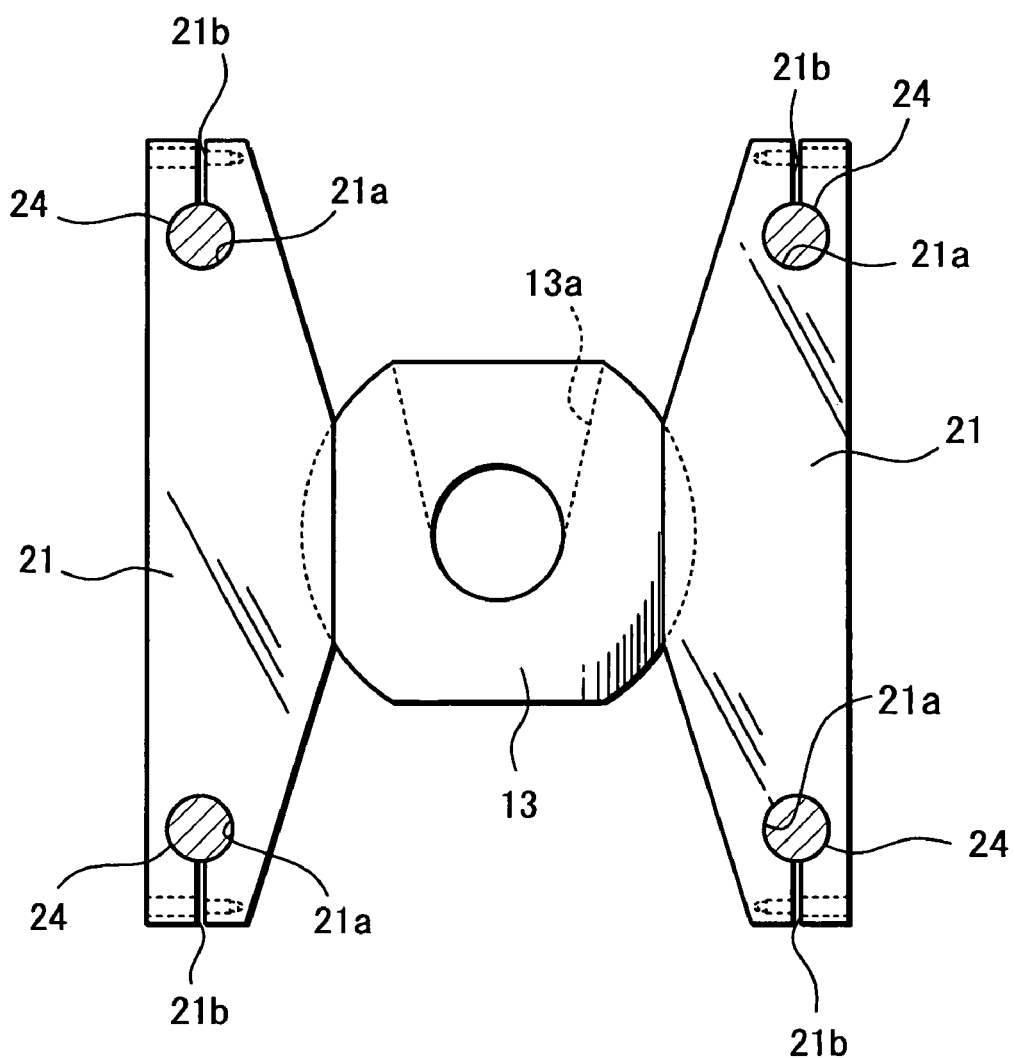
FIG. 5 is an explanatory view of a first mold of a mold device.

The first mold 13 of the mold device 12 is attached to the support 22 via a support member serving as the first support mechanism 21 (hereinafter, the first support mechanism is referred to as a support member 21) so that the first mold 13 can be moved in the same direction as the extrusion direction of the plunger 15 in association with the movement of the plunger 15 in the extrusion direction. That is to say, as shown in FIG. 5, vertical plate-shaped support members 21 are fixed at both sides of the outer peripheral surface of the first mold 13, and the guide shafts 24 are inserted in mounting holes 21a formed in the upper and lower portions of the support member 21, by which the support member 21 is fixed to the guide shafts 24. Thereby, the first mold 13 is attached to the support 22.

Also, the support member 21 is formed with slits 21b each continuous with the mounting hole 21a. By adjusting the width of the slit 21b by tightening a bolt (not shown), the tightening fixing force of the support member 21 applied to the guide shaft 24 in the mounting hole 21a can be adjusted.

According to the mounting construction of the first mold 13, an axial load is applied to the first mold 13 by the frictional resistance (frictional force) produced between the outer peripheral surface of the material compressed by the plunger 15 and the inner peripheral surface of the first mold 13. However, since the first mold 13 is attached to the four guide shafts 24 via the vertical plate-shaped support members 21, the support members 21 can be deformed elastically by the axial load, so that the first mold 13 can be displaced (moved) to the second mold 14 side. Thereby, the frictional resistance can be reduced.

The mounting construction of the second mold 14 is such that, as shown in FIG. 4, the second mold 14 is supported on the fixed plate 23a of the support 22 via the second support mechanism 17, and the second mold 14 is supported by the second support mechanism 17 so as to be moved in the same direction as the extrusion direction of the plunger 15 in association with the movement of the plunger 15 in the extrusion direction.

The second support mechanism 17 has a plurality of (four) horizontal shaft members 25 one end portion of each of which is fixed to the second mold 14, and a vertical connecting plate 26 which is fixed to the other end portions of the shaft members 25 and connects with the shaft members 25. The shaft members 25 penetrate the fixed plate 23a, so that the shaft members 25 can slide in the axial direction. Thereby, the second mold 14 can be moved in the axial direction.

When the plunger 15 does not penetrate the first mold 13 as shown in FIG. 4(b), the second support mechanism 17 supports the second mold 14 so that the second mold 14 moves in the extrusion direction of the plunger 15 together with the first mold 13. Further, when the plunger 15 has penetrated the first mold 13 as shown in FIG. 4(c), the second support mechanism 17 supports the second mold 14 so that the second mold 14 moves in the extrusion direction of the plunger 15 farther than the first mold 13.

Further, the second support mechanism 17 has an actuator 18 extending and contracting horizontally, which is provided between the fixed plate 23a of the support 22 and the connecting plate 26 of the support mechanism 17. This actuator 18 can be a hydraulic cylinder, and can operate to keep the distance between the fixed plate 23a and the connecting plate 26 from opening when the material is compressed and an axial load is applied to the second mold 14 by the frictional force between the outer peripheral surface of the material and the inner peripheral surface of the second mold 14 so that the second mold 14 separates from the first mold 13. That is to say, the actuator 18 functions as loading means for applying a resistance force in the direction opposite to the direction in which the second mold 14 is going to move in the axial direction so as to be separated from the first mold 13.

The operation of forming the gap g between the first mold 13 and the second mold 14 by the movement in the axial direction of the second mold 14 is performed automatically as described above by the frictional force between the material being compressed and the second mold 14 produced by the application of pressing force to the material performed by the pressing machine 9.

That is to say, the material for recycling containing metal powder is filled into the molding chamber of the mold device 12 as shown in FIG. 4(a), and the plunger 15 is moved toward the molding chamber by the operation of the pressing machine 9 so that the pressing force is applied to the material from the plunger 15 side to the pressure receiving member 16 side as shown in FIG. 4(b), by which the material is compressed. The material being compressed spreads to the side in the direction perpendicular to the pressing direction (by the plunger 15) of the pressing machine 9 in a cavity c, and is strongly pushed against the inner peripheral surface of the second mold 14. Thereby, the material is compressed while frictional resistance is produced between the material and the inner peripheral surfaces of the first mold 13 and the second mold 14. At this time, the second support mechanism 17 movably supports the second mold 14 so that the first mold 13 supported by the support members 21 is prevented from being moved by this frictional resistance.

The material is compressed in the cavity c of the second mold 14 as shown in FIG. 4(c) while frictional resistance is produced between the material and the inner peripheral surfaces of the first mold 13 and the second mold 14. The second mold 14 is moved in the axial direction against the resistance due to the actuator 18 so as to be separated from the first mold 13 by the frictional force between the outer peripheral surface of the compact consisting of the compressed material and the second mold 14. That is to say, when the frictional force produced between the material and the second mold 14 by the application of pressing force to the material increases and become's larger than the resistance due to the actuator 18, the second mold 14 moves.

That is to say, in the compression molding method implemented using this compression molding machine 2, during the compression molding using the plunger 15 shown in FIG. 4(c), (the sliding surface of) the mold device 12 is divided into a fore portion and a rear portion at a position on the rear side in the extrusion direction of the plunger 15 from the filling portion of the compact W to produce a gap g for drainage.

Further, by adjusting the magnitude of the resistance due to the actuator 18, the movement timing and displacement of the second mold 14 can be adjusted, and the formation timing and gap width of the gap g between the first mold 13 and the second mold 14 can be controlled.

According to the above-described mounting construction of the second mold 14, when the frictional force between the material compressed by being pushed by the plunger 15 and the second mold 14 increases in the cavity c of the second mold 14, the second mold 14 can be moved so as to release (eliminate) the frictional force, and the gap g is formed automatically between the first mold 13 and the second mold 14. Since the second mold 14 moves so as to release the frictional force, the wear of the inner peripheral surface of the second mold 14 can be reduced.

Then, excess water contained in the material is squeezed out by the compression of the material, and since the gap g is formed between the first mold 13 and the second mold 14 at the time of compression, the excess water squeezed out and pressurized is discharged vigorously to the outside of the mold device 12 through the gap g.

According to the mold device 12 of the compression molding machine 2 of the manufacturing apparatus in accordance with the present invention, the mold device 12 is a split mold consisting of the first mold 13 and the second mold 14, and the gap g is formed between the first mold 13 and the second mold 14 at the time of compression molding of material. Thereby, the resistance of drainage of water squeezed out of the compressed material to the outside of the mold device 12 is decreased, so that the water can be drained easily through the gap g, so that the water removal can be accomplished effectively. The amount of water in the briquettes completed by the conventional pressing machine without the use of the mold device 12 has a limit of about 10%. However, the use of the mold device 12 can provide a dried briquettes having a water amount less than 3%. Even if the briquettes manufactured in accordance with the present invention are charged into a blast furnace of a steel maker as they are, the occurrence of bumping (water vapor explosion) can be prevented because the briquettes have been dried sufficiently.

Further, since the first mold 13 and the second mold 14 can be moved in the axial direction when the material is compression molded, the frictional resistance produced between the outer peripheral surface of the compressed material and the inner peripheral surfaces of the first mold 13 and the second mold 14 can be released by this movement. Thereby, the pressing force of the pressing machine 9 can be kept from being consumed as a force withstanding the frictional resistance, so that the power of the pressing machine 9 can be decreased. In the conventional apparatus in which the mold is fixed to the frame, the pressing machine requires a capacity of about 80 tons. According to the apparatus in accordance with the present invention, however, the capacity of the pressing machine can be decreased to 60 tons.

That is to say, according to the present invention, when the recyclable material containing metal powder is compression molded by using the mold device 12 and the plunger 15 to manufacture briquettes, the power necessary for compressing the material by the plunger 15 can be decreased.

Figure 6:
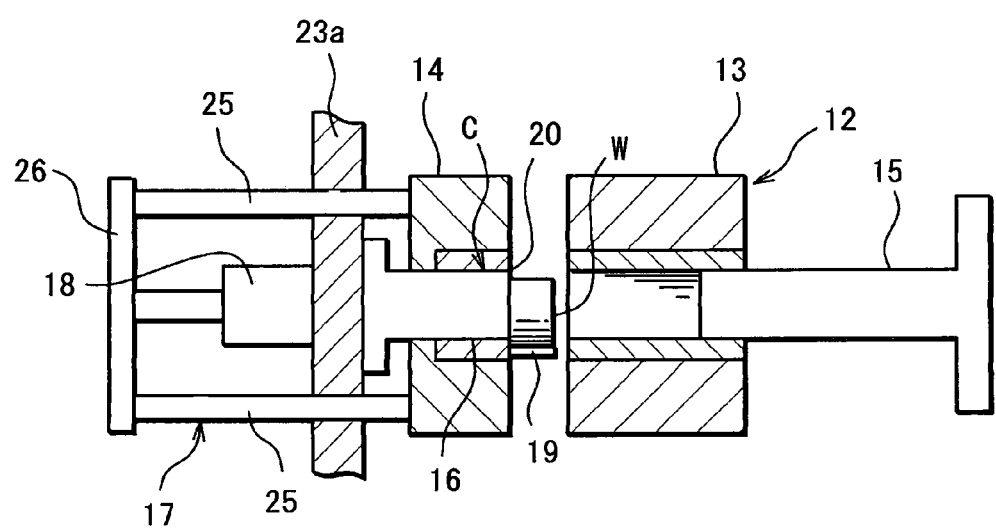
FIG. 6 is an explanatory view of a mold device section, illustrating the takeout of a compact.

The actuator 18 of the second support mechanism 17 is further explained. The actuator 18 can function as a device for discharging the material to take out the compact W having been compression molded in the mold device 12 from the cavity c. After the compression molding has been finished to obtain the compact W by compression molding the material and by moving the second mold 14 through a short distance in the direction of separating from the first mold 13 as shown in FIG. 4(c), the actuator 18 is extended as shown in FIG. 6 to move the second mold 14 through a long distance in the axial direction so that the second mold 14 is further separated from the first mold 13 (in the extrusion direction of the plunger 15). The second mold 14 is moved to a position closer to the fixed plate 23a than the position at the time of compression molding, by which the compact W is exposed. The pressure receiving member 16 inserted in the second mold 14 is fixed to the fixed plate 23a. By extending the actuator 18, the compact W having been compression molded in the cavity c of the second mold 14 is pushed out of the cavity c by the pressure receiving member 16.

Figure 7:
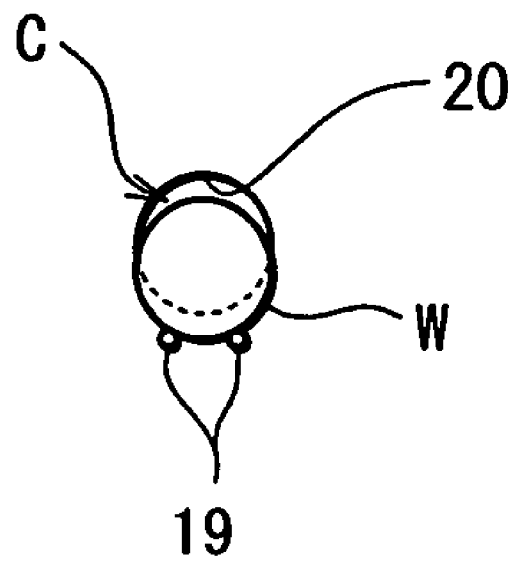
FIG. 7 is an explanatory view of a support member for supporting a taken-out compact.

As shown in FIGS. 6 and 7, the second mold 14 has support members 19 for supporting the compact W, which is discharged from the second mold 14, from the downside at two points. The support members 19 are provided in nearby portions under an opening end 20 of the cavity c formed in the second mold 14 between the mating surfaces of the first mold 13 and the second mold 14.

The support members 19 can be formed by two horizontal pins. These two parallel pins are fixed so as to project in the horizontal direction from the vertical mating surface of the second mold 14, and the first mold 13 is formed with hole portions (not shown) for accommodating these pins in the state in which the mating surfaces are in contact with each other.

According to the above-described configuration, at the same time that the second mold 14 retreats through a long distance so as to be separated from the first mold 13, the compact W is pushed out of the cavity c of the second mold 14, and the pins are disposed automatically just under the opening end 20 of the cavity c. Therefore, the compact W pushed out is supported by the two pins. The compact W supported by the pins is transferred to a tray 27 on the conveying machine 3 side shown in FIG. 8 by a chuck device, not shown.

Since the lower portion of the short columnar compact W is supported at two points by the two pins, the position of the center of the compact W taken out is always constant. Therefore, the compact W can easily be taken out by the chuck device.

Figure 8:
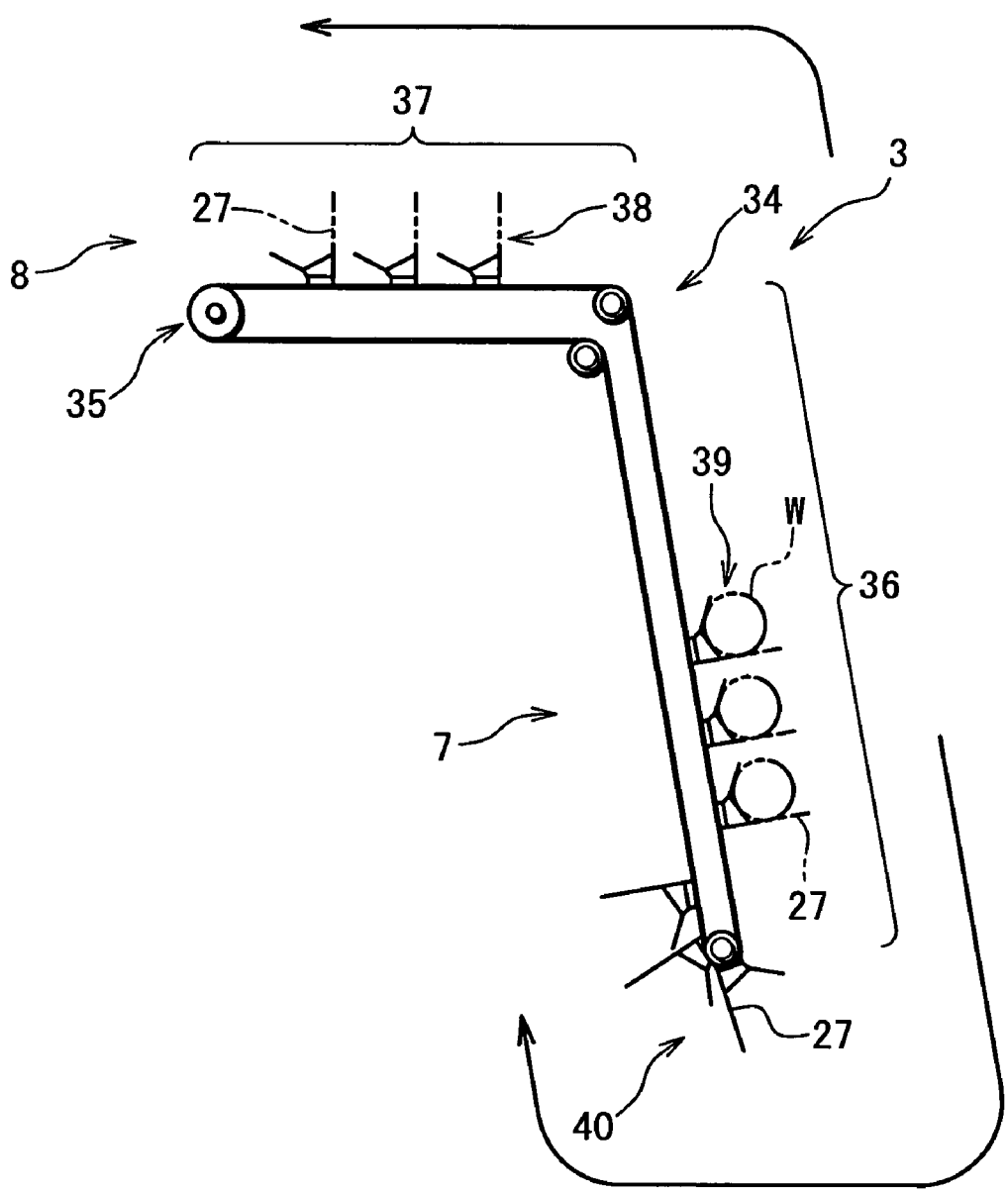
FIG. 8 is a side view for illustrating a conveying machine.

As shown in FIG. 8, the conveying machine 3, which is used to transport the compact W molded by the compression molding machine 2 to the upper stage portion 8 side, includes the trays 27 for receiving the compact W and a conveying mechanism for moving the trays 27. The conveying mechanism has a conveyor 34 and driving means 35 for driving the conveyor 34.

The conveyor 34 can be, for example, a chain conveyor. In this case, though not shown in the figure, the driving means 35 can be formed by a motor for driving the chain and sprockets. The conveyor 34 is not limited to a chain conveyor, and may be a belt conveyor or a conveyor of any other type.

The tray 27 that receives the compacts W is attached to the conveyor 34, and, as shown in FIG. 8, is provided so that three trays 27 are arranged in the conveyance direction. The tray 27 is formed by a vessel one side of which is open, and the compact W can be received through this opening portion. The bottom portion of the tray 27 is attached to the conveyor 34.

The conveyor 34 has a first transportation path 36 whose conveyance direction is the height direction and a second transportation path 37 whose conveyance direction is the horizontal direction. The first transportation path 36, which is slightly inclined with respect to the vertical plane but is straight in the height direction, is a portion in which the compact W molded in the lower stage portion 7 is received by the tray 27 and is transported to the upper stage portion 8. The second transportation path 37 is a horizontally straight portion that is continuous with the upper end portion of the first transportation path 36, and also a portion for feeding the compact W to the impregnation machine 4 and the drier 5 in the upper stage portion 8, which are the next process.

The transportation path of the tray 27 transported by the conveyor 34 has a compact transfer section 38 in the upper stage portion 8, in which the tray 27 is caused to correspond to the impregnation machine 4 and drier 5 side; a compact receiving section 39 in the lower stage portion 7, in which the tray 27 is caused to correspond to the compression molding machine 2 side; and a foreign matter removing section 40 at a position lower than the compact receiving section 39. The driving means 35 reciprocates the trays 27 between the compact transfer section 38 in the upper part and the foreign matter removing section 40 in the lower part with the compact receiving section 39 being held therebetween.

The movement of the trays 27 is explained in detail. When the trays 27 are positioned in the compact receiving section 39 on the first transportation path 36 and the compacts W are received, the conveyor 34 is operated by the driving means 35 to move the trays 27 holding the compacts W to the compact transfer section 38 on the second transportation path 37 and to stop them in this portion. Here, the compacts W are pulled up by a conveyance chuck 28 (refer to FIG. 9) of the impregnation machine 4, and the trays 27 become empty. Then, the driving means 35 operates in the reverse direction to move the conveyor 34 in the opposite direction, by which the empty trays 27 are moved downward. The trays 27 pass through the compact receiving section 39 and move to the foreign matter removing section 40 in the lower end portion of the first transportation path 36. The trays 27 in the foreign matter removing section 40 adopt a downward opening posture, so that foreign matters remaining in the trays 27 can be dropped automatically. The dropped foreign matters are recovered by a foreign matter recovery section (not shown) provided at a position under the foreign matter removing section 40. After the three trays 27 have been brought to a downward opening state in succession, the driving means 35 operates again in the reversed direction to move the conveyor 34 in the opposite direction, by which the trays 27 are moved to the compact receiving section 39.

Since the trays 27 reciprocate between the foreign matter removing section 40 and the compact transfer section 38, the passage region of the trays 27 can be made substantially one surface side of the conveyor 34 only. Therefore, the occupied space of the whole of the conveying machine 3 can be decreased, and thereby the apparatus can be made compact.

In the compact receiving section 39, the operation for transferring the compacts W to the three trays 27 is performed one by one of the trays 27 in succession. After the compacts W have been mounted on the three trays 27, the driving means 35 is operated. The tray 27 adopts a posture opening toward the chuck device, not shown, for transferring the compact W from the compression molding machine 2 side to the conveying machine 3 side, so that the compact W can be received easily.

Also, in the compact transfer section 38, the compacts W are taken up from the three trays 27 by the conveyance chuck 28 (refer to FIG. 9) of the impregnation machine 4, and after the three trays 27 have become empty, the driving means 35 is operated. In the compact transfer section 38, the three trays 27 are arranged at equal intervals in the horizontal direction, and the opening portions of the trays 27 are directed upward, so that the compacts W mounted on the trays 27 can be taken up easily by the conveyance chuck 28 located above the tray 27.

Figure 9:
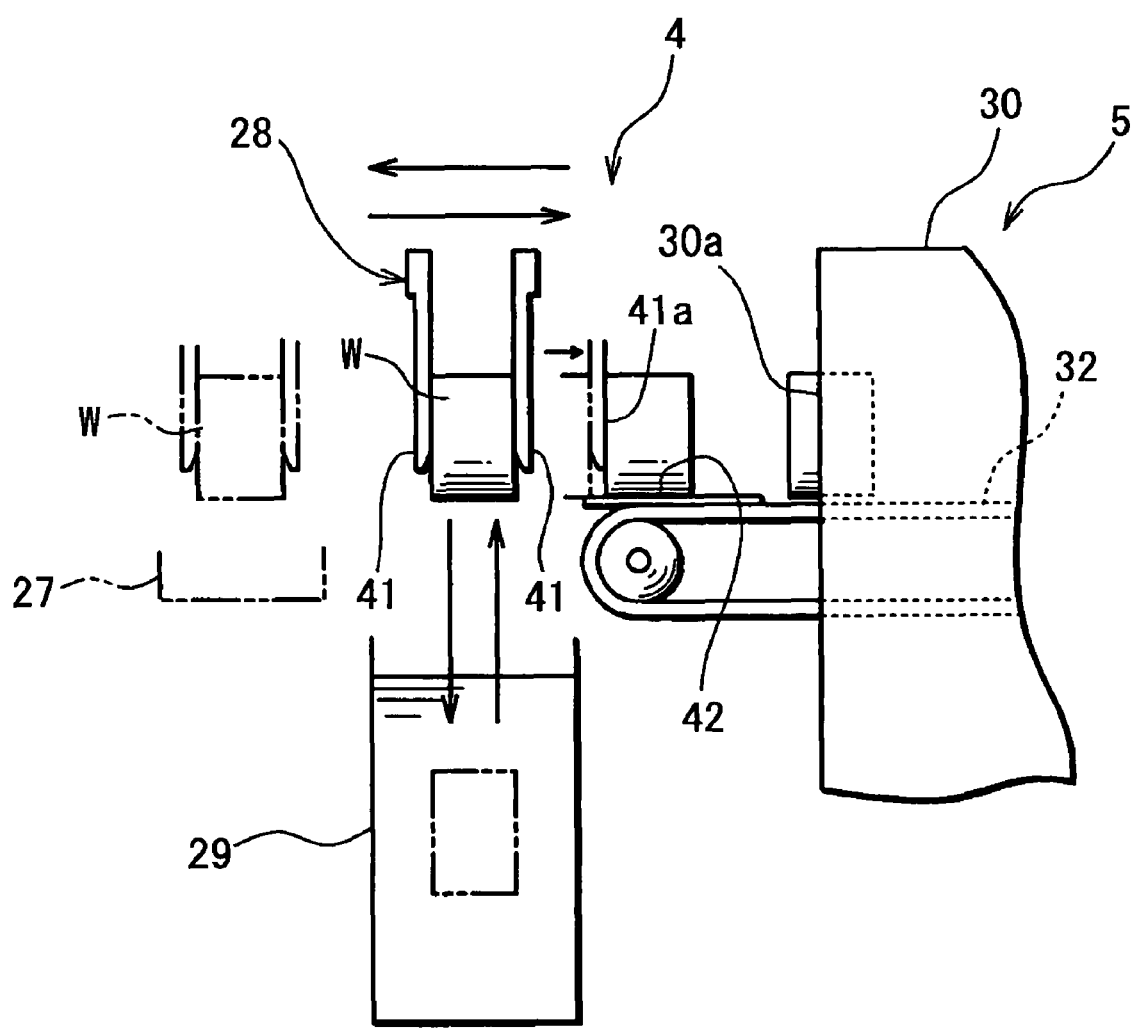
FIG. 9 is an explanatory view for illustrating an impregnation machine.

As shown in FIG. 9, the compact W taken up from the trays 27 by the conveyance chuck 28 of the impregnation machine 4 is lowered into a fluid tank 29 filled with a fluid containing a solidifying auxiliary substance (hereinafter referred to as a hardening fluid). The conveyance chuck 28 dips the compact W into the hardening fluid and impregnates it with the solidifying auxiliary substance. By impregnating the compact W with the solidifying auxiliary substance, solidification having a desired strength can be achieved. Since the grinding chips to which oil adheres, which are a material for briquettes, are difficult to stick to each other, it is difficult to solidify the material to the desired strength merely by compression molding. Therefore, if briquettes that are formed compression molding only without being impregnated with the solidifying auxiliary substance are charged into a blast furnace, the briquettes scatter and fly, and most of them may be recovered by a dust collector. However, the impregnation with the solidifying auxiliary substance prevents this phenomenon. As the hardening fluid, an aqueous solution containing at least one kind selected from colloidal silica, sodium silicate, and aluminum phosphate is preferably used.

The conveyance chuck 28 of the impregnation machine 4 is explained. The conveyance chuck 28 has a pair of claw members 41 for hanging the compact W while holing it from both sides. The conveyance chuck 28 can move the compact W in the horizontal direction and in the vertical direction.

The impregnation machine 4 has control means (not shown) consisting of a microcomputer and the like, and is configured so that the conveyance chuck 28 is operated by this control means. The conveyance chuck 28 grips the compact W by the claw members 41 and takes it out of the tray 27 of the conveying machine 3, and then moves the compact W horizontally to a position above the fluid tank 29. The conveyance chuck 28 lowers the compact W vertically into the fluid tank 29 in a state in which the compact W is gripped by the claw members 41 so that the compact W is dipped in the hardening fluid for a predetermined period of time and the surface portion of the compact W is impregnated with the hardening fluid. Subsequently, the conveyance chuck 28 raises the compact W vertically to the position above the fluid tank 29, and allows the compact W to stand still in the air for a predetermined period of time to drain excess hardening fluid out of the compact W.

Thereafter, the conveyance chuck 28 moves the compact W, which has been impregnated with the solidifying auxiliary substance, in the horizontal direction to the drying oven 30 side of the drier 5 while the compact W is gripped by the claw members 41.

At a position in front of a charge port 30a of the drying oven 30, there is provided a draining table 42 for mounting the compact W thereon before the compact W is charged into the drying oven 30. The aforementioned horizontal movement of the compact W using the conveyance chuck 28 is accomplished until the compact W is mounted on the draining table 42. The draining table 42 is provided so that the lower end of the compact W and the top surface of the draining table 42 have almost the same height at the time of this horizontal movement. Therefore, the compact W moves horizontally so that the lower end of the compact W slides on the top surface of the draining table 42, by which the hardening fluid remaining at the lower end of the compact W can be adhered to the draining table 42 side, and thus the hardening fluid remaining at the lower end is drained reliably.

Thus, the impregnation machine 4 first drains the hardening fluid dripping from the compact W at the position above the fluid tank 29 to remove excess solidifying auxiliary substance from the compact W impregnated with the solidifying auxiliary substance. The dripping hardening fluid is returned to the fluid tank 29 as it is. Next, by bringing the lower end of the compact W into contact with the draining table 42, the hardening fluid remaining at the lower end of the compact W can be removed. By these two draining operations, excess hardening fluid can be prevented from entering into the drying oven 30, and the conveyor 32 in the drying oven 30 can be prevented from being solidified by the solidifying auxiliary substance.

As shown in FIG. 9, the claw members 41 of the conveyance chuck 28 for moving the compact W horizontally to the draining table 42 can push the compact W, which has been mounted on the draining table 42, to the inside of the drying oven 30 by using a back surface 41a thereof. The compact W, which is pushed by the back surface 41a of one claw member 41 on the drying oven 30 side of the paired claw members 41, is mounted on the conveyor 32 of the drying oven 30, and is carried automatically into the drying oven 30.

The compact W on the draining table 42 is in a standing state for a predetermined period of time before the succeeding compact W comes onto the draining table 42.

As shown in FIG. 2, the drier 5 has the drying oven 30, the warm air generator 31 for supplying warm air (hot air) into the drying oven 30, and the conveyor 32 passing through the drying oven 30. The conveyor 32 can be, for example, a chain conveyor, and a transportation path using a mesh belt is formed.

A warm air supply port (not shown) of the warm air generator 31 is connected to the downstream end portion in the compact W conveying direction of the transversely long drying oven 30 so that the warm air flows in one direction from the downstream side to the upstream side in the conveyance direction of the drying oven 30. That is to say, in the drying oven 30, the direction in which the compact W is transported and the direction in which the warm air passes through are opposite to each other.

Figure 10:
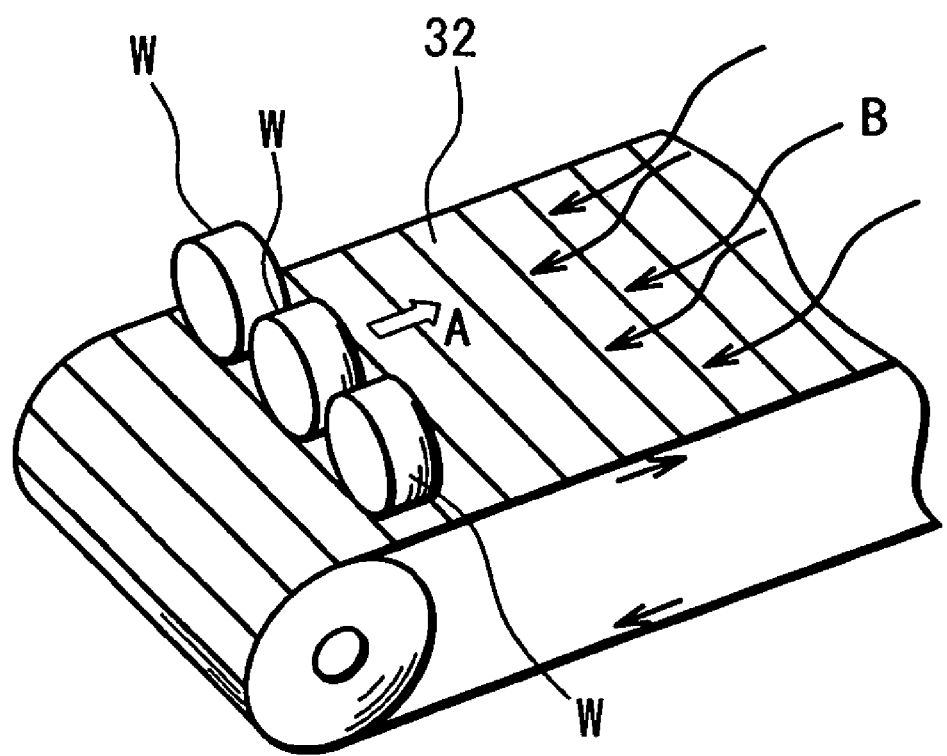
FIG. 10 is a perspective view for illustrating a compact in a drying oven of a drier.

Also, as shown in FIG. 10, the compact W transported by being mounted on the conveyor 32 is mounted in the state in which the outer peripheral surface thereof is brought into contact with the mounting surface of the mesh belt. Therefore, the compact W is in line contact with the mounting surface, so that the contact portion (contact area) between the mounting surface and the lower end of the compact W is small, and hence the warm air for drying the compact W can efficiently be brought into contact with the whole of the compact W. As a result, the drying operation can be performed in a short period of time, thereby increasing the manufacturing efficiency.

Also, since the compact W is mounted on the conveyor 32 in the state in which one place of the outer peripheral surface of the compact W is directed downward as described above, the number of compacts W accommodated in the drying oven 30 can be increased.

The conveyor 32 transports a plurality of compacts W in the state in which the compacts W are arranged in line in the conveyance direction (length wise direction) of the drying oven 30. However, a clearance is provided between the compacts W. Further, in the drying oven 30, the compacts W are dried in the state in which the compacts W are arranged in a plurality of rows (three rows in FIG. 10) in the direction perpendicular to the conveyance direction. Thereby, the number of compacts W lying in the drying oven 30 can be increased, so that the productivity can be enhanced. FIG. 10 shows only the compacts W arranged in one line and three rows for ease of explanation.

Figure 11:
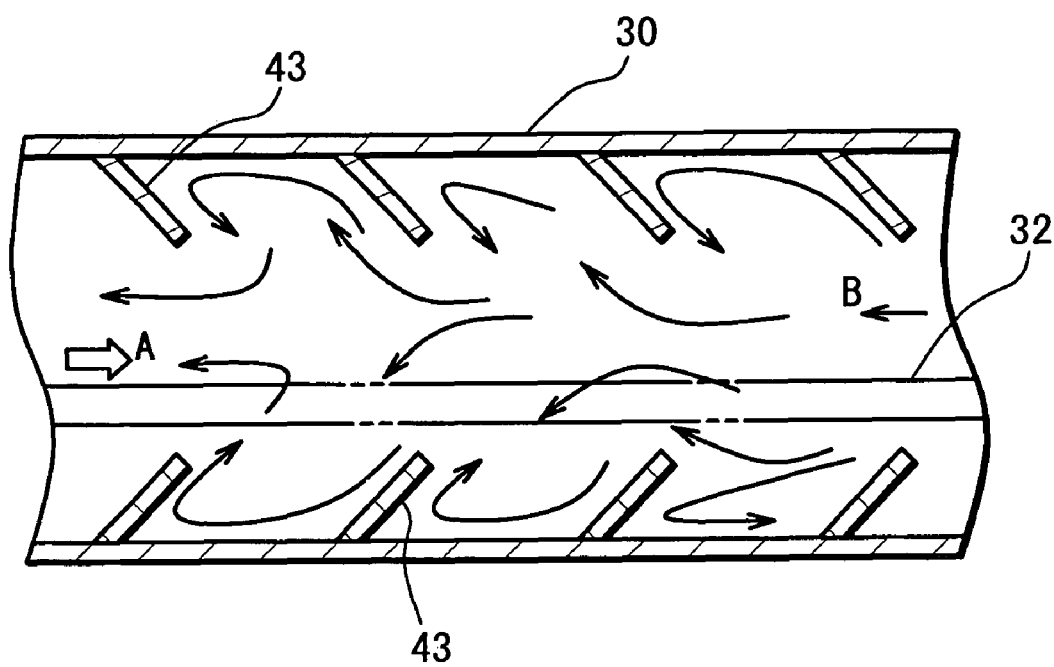
FIG. 11 is a sectional view of a drying oven.

Also, as shown in FIG. 11, in the drying oven 30, interrupting members 43 are formed to partially interrupt the warm air flowing from the downstream side to generate a turbulent flow. In FIGS. 10 and 11, the arrow mark A indicates the conveyance direction of the compact W, and the arrow mark B indicates the direction in which the warm air passes through.

The interrupting member 43 is a plate-shaped member in which the tip end portion extends so as to be directed from the inner wall surface (upper wall surface, lower wall surface, both side wall surfaces) of the drying oven 30 to the upstream side of warm air (the downstream side in the conveyance direction of the compact W), and is inclined with respect to the vertical plane. Therefore, the warm air supplied into the drying oven 30 can pass through the drying oven 30 while producing a turbulent flow, so that the warm air can be brought into contact with the compact W from different directions, by which the drying efficiency can be improved.

The compact W, which is carried by the conveyor 32 and passes through the drying oven 30, is discharged automatically through a discharge port 30b (refer to FIG. 1) of the drying oven 30, and is recovered into a recovery vessel (not shown).

According to the above-described briquette manufacturing apparatus in accordance with the present invention, automatically solidified briquettes can be obtained through the discharge port 30b of the drying oven 30 in approximately one hour after the material is charged into the hopper 1. The briquettes obtained by this apparatus have a strength enough to withstand truck transportation and lifting magnet conveyance. Further, dried high-quality briquettes that can be charged directly into a blast-furnace of a steel maker can be obtained.

Also, conventionally, the compression molding of a flocculent aggregate, which is the material, can be performed by the pressing machine, and the drying of the compact having been compression molded is performed by a drier separate from the pressing machine. In order to automate the manufacture of briquettes, the compact obtained by being compression molded by the pressing machine must be transported to the next process by using the conveying machine such as a conveyor.

As such a conveyor, a conveyor having a tray for receiving the compression molded compact is available, and the compact can be transported to the next process by being mounted in the tray. However, if the transportation of compact using the tray is repeated for a long period of time, powdery foreign matters (chips) that have come off the compact and dropped accumulate in the tray, and hence by the accumulated foreign matters, the posture of the compact is sometimes changed in the tray or the compact sometimes falls in the tray. If the compact falls in the tray, there arises a problem in that the operation of automatically transferring the compact in the tray to the next process, for example, by gripping the compact by the chuck device becomes difficult.

Accordingly, an object of the present invention is to provide a manufacturing apparatus for a briquette for a metal raw material, which has a conveying machine capable of transporting a compact, which is obtained by compression molding a recyclable material containing metal powder, stably for a long period of time.

To achieve this object, the manufacturing apparatus for a briquette for a metal raw material in accordance with the present invention includes the compression molding machine 2 for obtaining a compact by compression molding a recyclable material containing metal powder, the drier 5 for drying the compact, and the conveying machine 3 having the tray 27 for receiving the compact to transport the compact to the drier 5 side. The conveying machine 3 is characterized by having a conveying-mechanism in which the compact is transported by being received by the tray 27 and is transferred to the drier 5 side, and thereafter the empty tray 27 is moved and allowed to adopt a downward opening posture.

According to the above-described configuration, after the compact in the tray 27 has been transferred to the drier 5 side, the conveying mechanism moves the empty tray 27 and allows the empty tray 27 to adopt a downward opening posture. Therefore, the powdery foreign matters that drop from the compact and remain in the tray 27 can be dropped automatically, so that foreign matters can be prevented from remaining.

Thereupon, according to the manufacturing apparatus for a briquette for a metal raw material in accordance with the present invention, the compact, which is obtained by compression molding a recyclable material containing metal powder, can be transported to the next process stably for a long period of time.

Also, the above-described briquette manufacturing apparatus has one frame 6 on which the drier 5 and the compression molding machine 2 are mounted in a state of upper and lower two-stage arrangement so that the drier 5 lies in the upper stage portion 8 and the compression molding machine 2 lies in the lower stage portion 7. The conveying mechanism preferably has a transportation path in the height direction that receives the compact molded in the lower stage portion 7 and transports it to the upper stage portion 8. According to this configuration, since the drier 5 and the compression molding machine 2 are mounted on one frame 6 in a state of upper and lower two-stage arrangement, the installation area of the whole of apparatus can be decreased. Also, the compact molded in the lower stage portion 7 can be transported automatically to the upper stage portion 8.

Also, in the above-described briquette manufacturing apparatus, the transportation path of the tray 27, which the conveying mechanism has, has the compact transfer section 38 in the upper stage portion 8, in which the tray 27 is caused to correspond to the drier 5 side, the compact receiving section 39 in the lower stage portion 7, in which the tray 27 is caused to correspond to the compression molding machine 2 side, and the foreign matter removing section 40 that is located at a position lower than the compact receiving section 39 and allows the tray 27 to adopt a downward opening posture. The conveying mechanism preferably has the driving means 35 for reciprocating the tray 27 between the compact transfer section 38 in the upper part and the foreign matter removing section 40 in the lower part with the compact receiving section 39 being held therebetween. According to this configuration, after the compact received from the compression molding machine 2 side in the compact receiving section 39 has been transported one time to the compact transfer section 38 in the upper stage portion 7, the tray 27 is moved to the foreign matter removing section 40 by the driving means 35 after passing through the compact receiving section 39, and in the foreign matter removing section 40, the tray 27 can adopt a downward opening posture.

Further, the conventional apparatus has a problem in that work for dipping the compact into the fluid tank filled with the fluid containing the solidifying auxiliary substance to impregnate the compact, which is obtained by compression molding a flocculent aggregate, with the solidifying auxiliary substance and work for transferring the compact impregnated with the solidifying auxiliary substance to the next drier side are complicated.

Accordingly, an object of the present invention is to provide a manufacturing apparatus for a briquette for a metal raw material, in which the operation for impregnating the compact with the solidifying auxiliary substance and the operation for transferring the compact to the next process can be performed efficiently.

That is to say, to achieve this object, the manufacturing apparatus for a briquette for a metal raw material includes the compression molding machine 2 for obtaining a compact by compression molding a recyclable material containing metal powder, the impregnation machine 4 having the fluid tank 29 for dipping the compact into the fluid containing the solidifying auxiliary substance, and the drier 5 for drying the compact impregnated with the solidifying auxiliary substance. The impregnation machine 4 is characterized by having the conveyance chuck 28 that lowers the compact in the vertical direction into the fluid tank 29 and raises it to a position above the fluid tank 29, and also moves the compact impregnated with the solidifying auxiliary substance in the horizontal direction to the drier 5 side.

According to this configuration, the conveyance chuck 28 can lower the compact in the vertical direction to dip the compact into the fluid tank 29 filled with the fluid containing the solidifying auxiliary substance, and can raise the compact in the vertical direction to take the compact up from the fluid tank 29. Further, the conveyance chuck 28 can move the compact in the horizontal direction to transfer the compact to the next drying process. By the simple operation of the conveyance chuck 28 in the perpendicular two directions of the vertical direction and the horizontal direction, the compact can be impregnated with the solidifying auxiliary substance and can be transferred to the next drying process.

As described above, according to the manufacturing apparatus for a briquette for a metal raw material in accordance with the present invention, the compact obtained by compression molding a recyclable material can be impregnated with the solidifying auxiliary substance and can be transferred further to the next process by a simple configuration.

Also, the impregnation machine 4 preferably has the control means for keeping the conveyance chuck 28 gripping the compact at a position above the fluid tank 29 for a predetermined period of time to remove excess solidifying auxiliary substance from the compact impregnated with the solidifying auxiliary substance. According to this configuration, the fluid containing excess solidifying auxiliary substance dripping from the compact can be drained at the position above the fluid tank 29, and also the dripping fluid can be returned to the fluid tank 29.

Also, the impregnation machine 4 preferably has the draining table 42 on which the compact is mounted before being charged into the drier 5. Thereby, the compact is mounted on the draining table 42 before being charged into the drier 5. By bringing the lower part of the compact into contact with the draining table 42, the fluid remaining in the lower part of the compact can be removed from the compact. Therefore, excess solidifying auxiliary substance is prevented from entering into the drier 5, and hence the equipment in the drier 5 can be prevented from being solidified by the solidifying auxiliary substance, so that the function of equipment can be prevented from decreasing.

Also, the compact has a short columnar shape, and the drier 5 has the drying oven 30 for drying the compact while conveying it. This drying oven 30 preferably has the mounting surface for conveying the compact in the state in which the outer peripheral surface of the compact is brought into contact with the mounting surface. According to this configuration, the mounting surface of the drying oven 30 on which the compact is mounted and the outer peripheral surface of the compact are in line contact with each other, so that the contact area between them can be as small as possible, and therefore the warm air for drying the compact can be brought into contact with the compact efficiently. Thereby, the compact can be dried in a short period of time, by which the manufacturing efficiency is improved.

Also, the drier 5 has the warm air generator 31 for supplying warm air into the drying oven 30 so that the warm air flows in one direction in the lengthwise direction of the drying oven 30. In the drying oven 30, the interrupting members 43 are preferably formed to partially interrupt the warm air to generate a turbulent flow. According to this configuration, the warm air supplied into the drying oven 30 can pass through the drying oven 30 while producing a turbulent flow, so that the warm air can be brought into contact with the compact from different directions, by which the drying efficiency can be improved.

Also, the briquette manufacturing apparatus in accordance with the present invention is not limited to the mode shown in the drawings, and any other mode may be used in the scope of the present invention. The configuration may be such that the actuator 18 of the compression molding machine 2 is of an electric motor type instead of a pressing cylinder type, so that the pressing rod 10 is operated in the axial direction by an electric motor. Alternatively, in the conveying machine 3, the number of trays 27 may be other than three, for example, may be two or four or more.

What is claimed is:

1. A compression molding machine for a briquette for a metal raw material, comprising a mold device in which a molding chamber for compression molding a recyclable material containing metal powder is formed; and a plunger which is provided coaxially with the molding device so as to be capable of advancing and retreating in an axial direction to compression mold the material supplied into the molding chamber, wherein
the molding device includes an axially fixed pressure receiving member forming a pressure receiving surface facing to a tip end surface of the plunger; an outside mold having a slidingly contacting surface, which is in sliding contact with an outer peripheral surface of the plunger, therein; and supporting means which supports the outside mold so that the outside mold moves in an extrusion direction of the plunger in association with a movement of the plunger in the extrusion direction.

2. The compression molding machine for a briquette for a metal raw material according to claim 1, wherein the outside mold is divided into a fore portion and a rear portion in the extrusion direction of the plunger into a first mold and a second mold, the first mold being arranged at a position such as to be penetrated by the plunger at the time of a maximum stroke, and the second mold being arranged at a position such that a compact compressed by the plunger at the time of the maximum stroke is filled therein.

3. The compression molding machine for a briquette for a metal raw material according to claim 2, wherein the supporting means has a function of producing a difference in displacement in the extrusion direction of the plunger between the first and second molds so that a gap is formed between the first and second molds after the plunger has penetrated the first mold.

4. The compression molding machine for a briquette for a metal raw material according to claim 3, wherein the supporting means includes a first support mechanism which supports the first mold so that the first mold moves in the extrusion direction of the plunger in association with the movement of the plunger in the extrusion direction; and a second support mechanism which supports the second mold so that the second mold moves in the extrusion direction of the plunger together with the first mold when the plunger does not penetrate the first mold, and so that the second mold moves farther in the extrusion direction of the plunger from the first mold when the plunger has penetrated the first mold.

5. The compression molding machine for a briquette for a metal raw material according to claim 4, wherein the second support mechanism has an actuator for discharging the material, which moves the second mold in the extrusion direction of the plunger to expose the compact.

6. The compression molding machine for a briquette for a metal raw material according to claim 2, wherein the outside mold has support members for supporting the compact, which is discharged from the second mold, at two points from the downside, the support members being provided in nearby portions under an opening end of a cavity formed in the second mold.

7. A manufacturing apparatus for a briquette for a metal raw material, comprising a hopper attached to a frame; a compression molding machine for compression molding the material charged from the hopper; and a conveying machine with a drying function, which transports a compression molded compact while drying the compact, wherein
the compression molding machine includes a mold device in which a molding chamber for compression molding a recyclable material containing metal powder is formed;

and a plunger which is provided coaxially with the molding device so as to be capable of advancing and retreating in an axial direction to compression mold the material supplied into the molding chamber, and the molding device includes an axially fixed pressure receiving member forming a pressure receiving surface facing to a tip end surface of the plunger; an outside mold having a slidingly contacting surface, which is in sliding contact with an outer peripheral surface of the plunger, therein; and supporting means which supports the outside mold so that the outside mold moves in an extrusion direction of the plunger in association with a movement of the plunger in the extrusion direction.

8. A manufacturing apparatus for a briquette for a metal raw material, comprising a compression molding machine for obtaining a compact by compression molding a recyclable material containing metal powder; a drier for drying the compact; a conveying machine for transporting the compact to the drier side; and one frame on which the drier and the compression molding machine are mounted in a state of upper and lower two-stage arrangement so that the drier lies in an upper stage portion and the compression molding machine lies in a lower stage portion.

9. The manufacturing apparatus for a briquette for a metal raw material according to claim 8, wherein an impregnation machine for dipping the compact with a fluid containing a solidifying auxiliary substance is provided between the compression molding machine in the lower stage portion and the drier in the upper stage portion.

10. The manufacturing apparatus for a briquette for a metal raw material according to claim 8, wherein the compression molding machine includes a mold device in which a molding chamber for molding the recyclable material is formed; and a pressing rod for pressing the material along a lengthwise direction of the frame to compression mold the material in the mold device, and the drier includes a drying oven for conveying the compact along the lengthwise direction of the frame.

11. The manufacturing apparatus for a briquette for a metal raw material according to claim 10, wherein the mold device is arranged on one side in the lengthwise direction of the frame, and a conveyance direction of the compact in the drying oven is directed from one side to the other side in the lengthwise direction of the frame.

12. A compression molding method for a briquette for a metal raw material, in which a recyclable material containing metal powder is filled in a molding chamber formed by an axially fixed pressure receiving surface facing to a tip end surface of a plunger and a sliding surface with which an outer peripheral surface of the plunger is in sliding contact; and the sliding surface is moved in an extrusion direction of the plunger in association with a movement of the plunger in the extrusion direction by the plunger moving toward the molding chamber; and the plunger compress the material, by which a solidified compact is obtained.

13. A compression molding method for a briquette for a metal raw material, in which a recyclable material containing metal powder is filled in a molding chamber formed by an axially fixed pressure receiving surface facing to a tip end surface of a plunger and a sliding surface with which an outer peripheral surface of the plunger is in sliding contact; the material is compressed by the plunger moving toward the molding chamber; during the compression molding operation using the plunger, a gap for drainage is produced by dividing the sliding surface into a fore portion and a rear portion on a rear side in an extrusion direction of the plunger from a filling portion of the compact, by which a solidified compact is obtained.

14. The compression molding machine for a briquette for a metal raw material according to claim 3, wherein the outside mold has support members for supporting the compact, which is discharged from the second mold, at two points from the downside, the support members being provided in nearby portions under an opening end of a cavity formed in the second mold.

15. The compression molding machine for a briquette for a metal raw material according to claim 4, wherein the outside mold has support members for supporting the compact, which is discharged from the second mold, at two points from the downside, the support members being provided in nearby portions under an opening end of a cavity formed in the second mold.

16. The compression molding machine for a briquette for a metal raw material according to claim 5, wherein the outside mold has support members for supporting the compact, which is discharged from the second mold, at two points from the downside, the support members being provided in nearby portions under an opening end of a cavity formed in the second mold.

17. The manufacturing apparatus for a briquette for a metal raw material according to claim 9, wherein the compression molding machine includes a mold device in which a molding chamber for molding the recyclable material is formed; and a pressing rod for pressing the material along a lengthwise direction of the frame to compression mold the material in the mold device, and the drier includes a drying oven for conveying the compact along the lengthwise direction of the frame.

* * * * *